US009689331B1

(12) United States Patent
Lavallee et al.

(10) Patent No.: US 9,689,331 B1
(45) Date of Patent: Jun. 27, 2017

(54) METHOD AND APPARATUS TO CONTROL FUEL INJECTION IN AN INTERNAL COMBUSTION ENGINE

(71) Applicant: GM GLOBAL TECHNOLOGY OPERATIONS LLC, Detroit, MI (US)

(72) Inventors: Jean-Yves Lavallee, Farmington Hills, MI (US); Joshua Clifford Bedford, Farmington Hills, MI (US); Giuseppe Mazzara Bologna, Nicosia (IT); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/079,625

(22) Filed: Mar. 24, 2016

(51) Int. Cl.
 F01N 3/00 (2006.01)
 F02D 41/02 (2006.01)
 F01N 3/20 (2006.01)
 F02D 35/00 (2006.01)
 F02D 41/14 (2006.01)

(52) U.S. Cl.
 CPC .......... F02D 41/0255 (2013.01); F01N 3/20 (2013.01); F02D 35/0092 (2013.01); F02D 41/1446 (2013.01)

(58) Field of Classification Search
 USPC ......... 60/274, 276, 277, 284, 285, 286, 297, 60/301
 See application file for complete search history.

(56) References Cited

U.S. PATENT DOCUMENTS

| | | | | | |
|---|---|---|---|---|---|
| 5,974,793 | A | * | 11/1999 | Kinugasa | ........... B01D 53/9454 60/278 |
| 6,666,020 | B2 | * | 12/2003 | Tonetti | .................. F02D 41/027 123/299 |
| 7,540,146 | B2 | * | 6/2009 | Narita | ................... F01N 3/0842 60/286 |
| 7,707,821 | B1 | * | 5/2010 | Legare | .................... F01N 3/101 60/274 |
| 8,402,944 | B2 | * | 3/2013 | Lorenz | ................... F02D 35/027 123/406.45 |
| 8,627,652 | B2 | * | 1/2014 | Iwashita | ............... F01N 3/0231 60/273 |

* cited by examiner

Primary Examiner — Binh Q Tran
(74) Attorney, Agent, or Firm — Quinn IP Law

(57) ABSTRACT

An internal combustion engine is coupled to an oxidation catalyst disposed upstream of a second catalytic device. A controller includes an instruction set executable to detect a cold start engine starting event, monitor first and second temperature sensors, control each of the fuel injectors to execute a first set of fuel injection events for each cylinder event in response to an output torque request, and execute a second set of fuel injection events for each cylinder event after cylinder top-dead-center. The second set of fuel injection events includes a final injection event, and a duration of the final injection event is determined based upon the first and second temperatures.

20 Claims, 3 Drawing Sheets

METHOD AND APPARATUS TO CONTROL FUEL INJECTION IN AN INTERNAL COMBUSTION ENGINE

TECHNICAL FIELD

The disclosure relates to internal combustion engines, and more specifically to controlling fuel injection in an internal combustion engine to heat an exhaust aftertreatment system.

BACKGROUND

Internal combustion engines are equipped with exhaust aftertreatment systems that include catalytic and non-catalytic processes to oxidize, reduce, filter or otherwise purify exhaust gas constituents in an exhaust gas feedstream. There is a need to manage heating for various elements of an exhaust aftertreatment system.

SUMMARY

A multi-cylinder internal combustion engine system is described, and includes an internal combustion engine having a plurality of fuel injectors disposed to directly inject fuel into cylinders and an exhaust aftertreatment system that is fluidly coupled to an exhaust manifold of the internal combustion engine. The exhaust aftertreatment system includes an oxidation catalyst disposed upstream of a second catalytic device, with a first temperature sensor disposed to monitor a first temperature of an exhaust gas feedstream upstream of the oxidation catalyst and a second temperature sensor disposed to monitor a second temperature of the exhaust gas feedstream downstream of the oxidation catalyst. A controller is operatively connected to the fuel injectors and disposed to monitor the first and second temperature sensors. The controller includes an instruction set executable to detect a cold start engine starting event, monitor the first and second temperature sensors, control each of the fuel injectors to execute a first set of fuel injection events for each cylinder event in response to an output torque request, and execute a second set of fuel injection events for each cylinder event after cylinder top-dead-center. The second set of fuel injection events includes a final injection event, and a duration of the final injection event is determined based upon the first and second temperatures of the exhaust gas feedstream.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
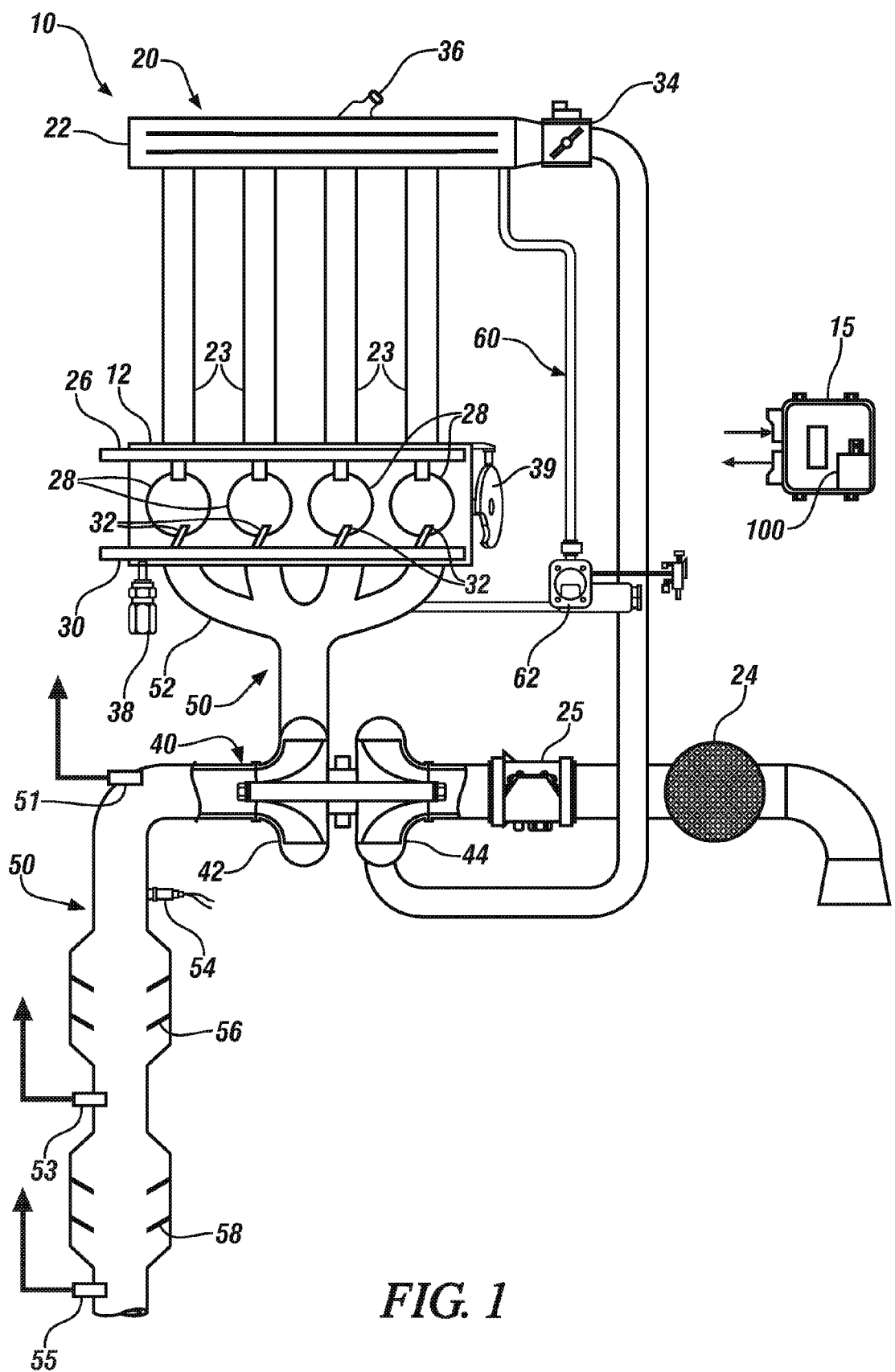
FIG. 1 schematically illustrates an internal combustion engine system including an internal combustion engine, exhaust aftertreatment system and accompanying controller in accordance with the disclosure.

Referring now to the drawings, wherein the depictions are for the purpose of illustrating certain exemplary embodiments only and not for the purpose of limiting the same, FIG. 1 schematically illustrates an internal combustion engine system 10 including an internal combustion engine (engine) 12, exhaust aftertreatment system 50 and accompanying controller 15 that have been constructed in accordance with this disclosure. The engine 12 preferably includes a multi-cylinder direct-injection four-stroke internal combustion engine including an engine block, pistons, crankshaft, engine head, and other base engine components and systems. The engine 12 is preferably configured as a compression-ignition engine that operates at an air/fuel ratio that is primarily lean of stoichiometry in one embodiment, although the disclosure is not so limited. The disclosure may be advantageously applied to various direct-injection internal combustion engine systems that employ exhaust aftertreatment systems.

The engine 12 may include, in one non-limiting embodiment, an air intake system 20, a fuel injection system 30, an intake air compressing system 40 and an exhaust gas recirculation (EGR) system 60. The engine 12 operates in repetitively executed cycles, wherein each cycle includes successive intake, compression, power and exhaust strokes that are referred to herein as a cylinder event. Engine operation may be monitored directly using sensors, or estimated using executable models and simulations, as described herein. One engine monitoring sensor includes an engine coolant temperature (ECT) sensor 38. Another engine monitoring sensor includes a crankshaft position sensor 39 for monitoring engine rotational speed (RPM) and piston position.

The air intake system 20 provides intake air to an intake manifold 22 that distributes and directs air into intake runners 23 leading to engine cylinders 28. The air intake system 20 has airflow ductwork and devices for monitoring and controlling the intake air flow. Devices for controlling the intake air flow include an intake air filter 24, a charge air cooler (when employed) and a throttle valve 34. The throttle valve 34 preferably includes an electronically controlled device that controls the intake airflow to the engine 12 in response to a control signal from the controller 15. The intake air compressing system 40 includes an intake air compressor 44 that is driven by an exhaust turbine 42 fluidly coupled to the exhaust system 50. Devices for monitoring the intake air flow preferably include a mass airflow sensor 25, which is preferably configured to monitor intake mass airflow, intake air temperature, air humidity and inlet air pressure. The intake mass airflow measured by the mass airflow sensor 25 may be employed to determine a measure of intake air per cylinder. A pressure sensor 36 in the intake manifold 22 monitors manifold absolute pressure and barometric pressure.

The fuel injection system 30 preferably includes a plurality of direct-injection fuel injectors 32 for supplying fuel directly into individual ones of the cylinders 28. In one embodiment, a common rail fuel system supplies pressurized fuel to all the fuel injectors 32. In one embodiment, the fuel injectors 32 are solenoid-activated devices that are controlled by command signals originating from the controller 15. The fuel injectors 32 are capable of executing multiple fuel injection events during each cylinder event. The multiple fuel injection events may include one or more pilot injection events during the compression stroke, one or more main injection events late in the compression stroke, and one or more multi-after injection (MAI) events after top-dead-center (TDC), i.e., during the power stroke. A mass of fuel delivered to each of the cylinders 28 during the pilot injection events and the main injection events for each cylinder event may be employed to indicate engine load, as known to those skilled in the art. A certain portion of the after injection events may also be included in engine load estimation.

An exhaust manifold 52 entrains exhaust gases that are expelled from the engine 12 for channeling through the exhaust turbine 42 of the intake air compressing system 40 to the exhaust aftertreatment system 50. An EGR system 60 recirculates a portion of the exhaust gases to the intake manifold 22 through a flow control valve referred to as an EGR valve 62. The EGR system 60 may include, e.g., an EGR cooler, a bypass valve and related sensors. The controller 15 controls mass flow of exhaust gas to the intake manifold 22 by controlling opening of the EGR valve 62. The EGR system 60 and related control systems are known.

The exhaust aftertreatment system 50 preferably includes a plurality of exhaust purification devices, a plurality of temperature sensors and one or a plurality of exhaust gas sensors 54. The exhaust purification devices may include, by way of example, a first exhaust aftertreatment device, e.g., in the form of an oxidation catalyst 56 that is disposed upstream of a second exhaust aftertreatment device, e.g., in the form of a selective catalyst reduction device 58. A particulate filter device may also be employed. The temperature sensors preferably include a first temperature sensor 51 that is disposed to monitor temperature of the exhaust gas feedstream upstream of the oxidation catalyst 56 and a second temperature sensor 53 that is disposed to monitor temperature of the exhaust gas feedstream between the oxidation catalyst 56 and the selective catalyst reduction device 58. A third temperature sensor 55 may be disposed to monitor temperature of the exhaust gas feedstream downstream of the selective catalyst reduction device 58. The exhaust gas sensors 54 may include, by way of example, an engine-out NOx sensor and/or a wide-range air/fuel ratio sensor. Each of the first, second and third temperature sensors 51, 53 and 55, and the exhaust gas sensors 54 communicate with the controller 15, either directly or via a communication bus. The selective catalyst reduction device 58 may be an ammonia-selective reduction device in certain embodiments, with an accompanying urea injection system disposed in the exhaust gas feedstream. Alternatively, the selective catalyst reduction device 58 may be a hydrocarbon-selective reduction device in certain embodiments, with an accompanying system to supply hydrocarbons into the exhaust gas feedstream.

The controller 15 preferably includes an executable control routine 100, an embodiment of which is described with reference to FIG. 2. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine 100. As used herein, the term 'engine-specific' indicates a specific model of an engine produced by a manufacturer, and preferably relates to elements such as cylinder configuration, fuel delivery and others.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. Data signals may include analog, discrete or digitized analog signals representing inputs from sensors, signals representing actuator commands, and communication signals between controllers. The term 'model' refers to a processor-based or processor-executable code and associated calibration that simulates a physical existence of a device or a physical process. Additionally, it is noted that the term "signal" means a detectable physical quantity that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

Figure 2:
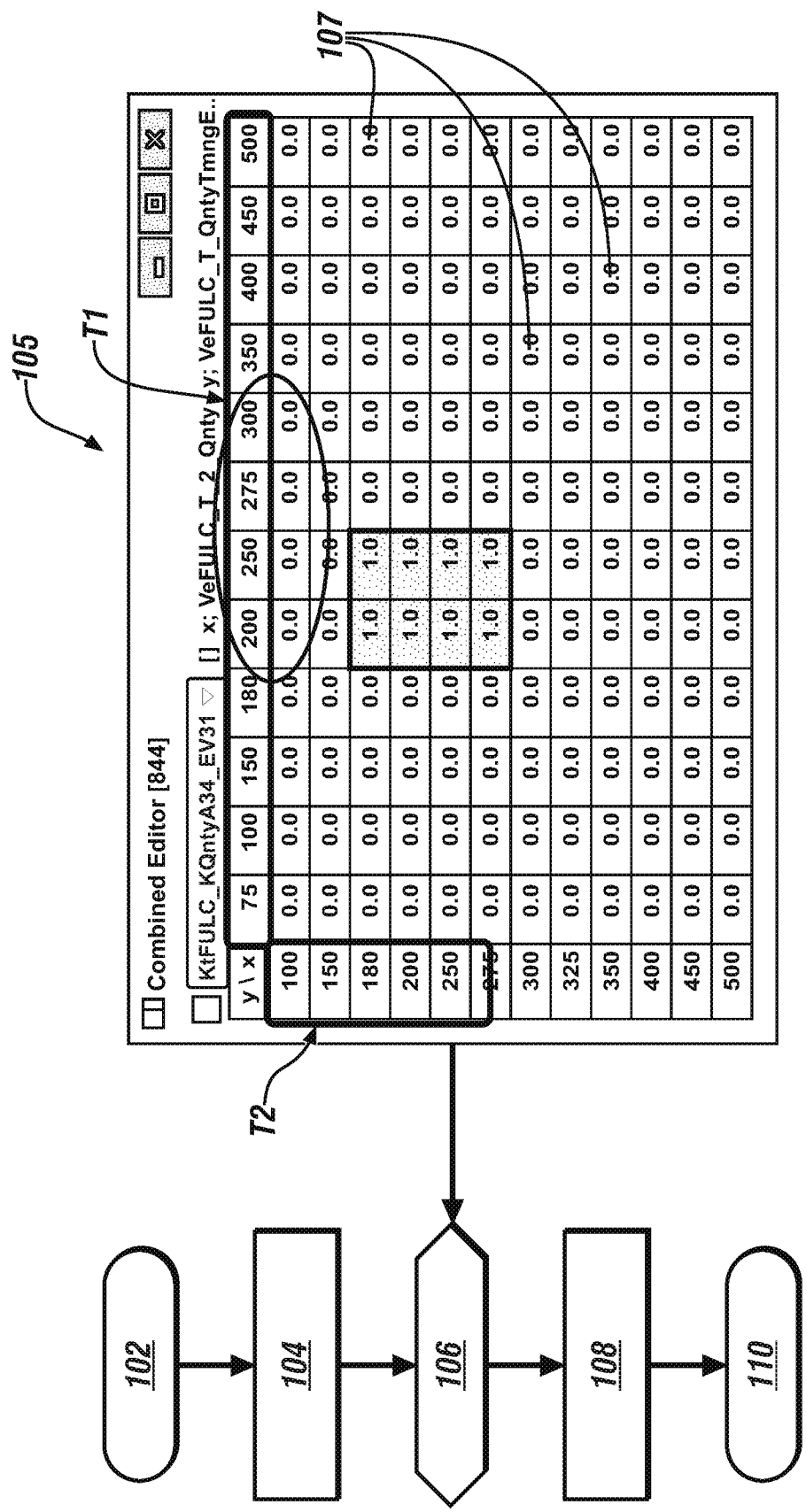
FIG. 2 schematically shows a multi-after fuel injection control routine including an instruction set that is executable in a controller to control operation of an internal combustion engine system during a cold start, in accordance with the disclosure.
Figure 3:
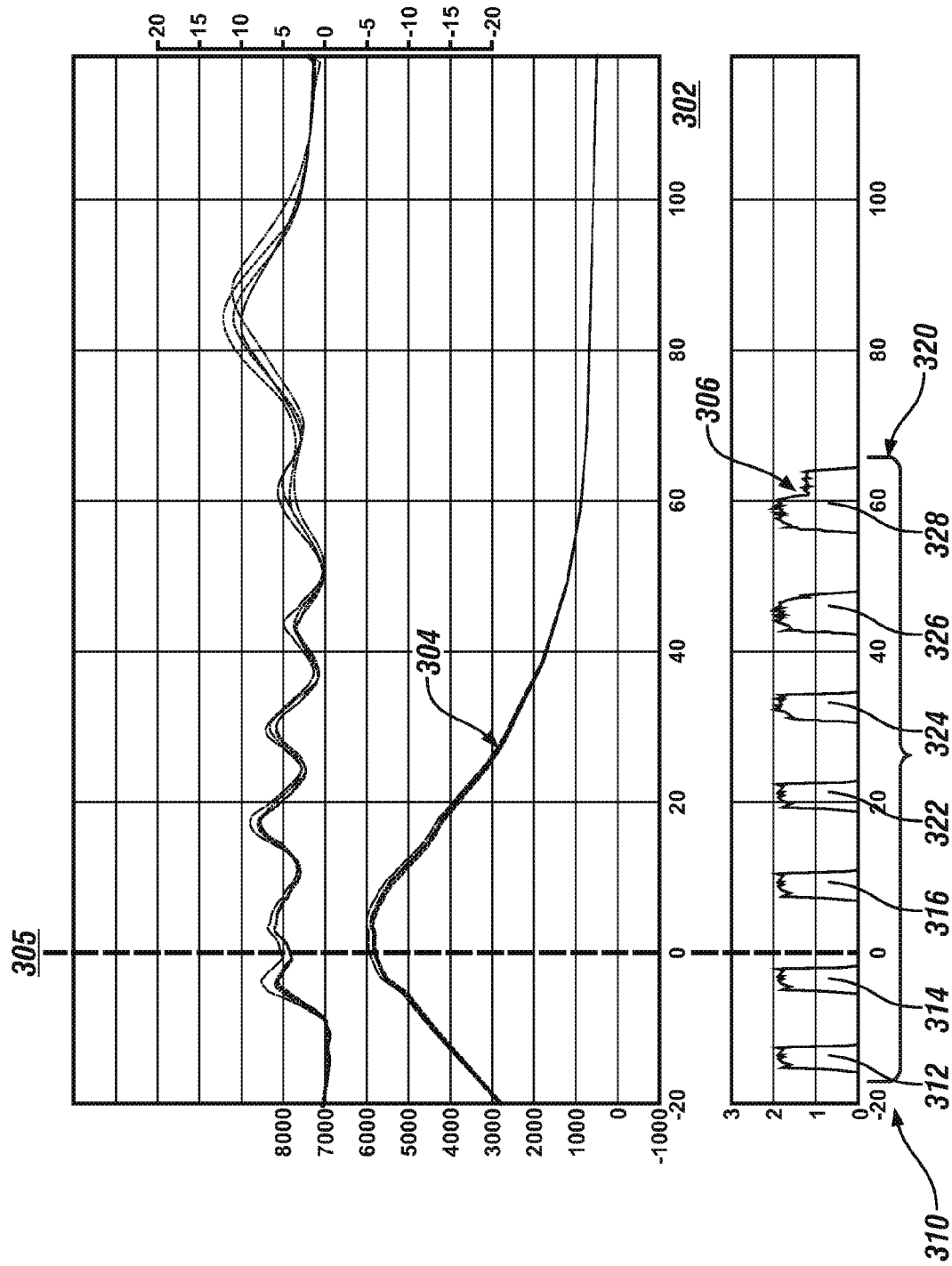
FIG. 3 graphically shows certain details of a portion of a single cylinder event that includes execution of an embodiment of the multi-after fuel injection control routine described with reference to FIG. 2 in an embodiment of the internal combustion engine system that is described with reference to FIG. 1, including a first set of fuel injection events that occur prior to cylinder top-dead-center (TDC), and a second set of fuel injection events that occur after TDC, with associated cylinder pressure and injector energy, in accordance with the disclosure.

FIG. 2 schematically shows a multi-after fuel injection control routine (MAI routine) 100 including an instruction set that is executable in the controller 15 to control operation of an embodiment of the internal combustion engine system 10 that is described with reference to FIG. 1 during a cold start. FIG. 3 graphically shows certain details of a portion of a single cylinder event that includes execution of an embodiment of the MAI routine 100 for an embodiment of the internal combustion engine system 10 that is described with reference to FIG. 1, including a first set of fuel injection events 310 that occur prior to TDC 305, and a second set of fuel injection events 320 that occur after TDC 305. Cylinder pressure (kPa) 304 and injection energy (V) 306 are plotted in relation to crank angle (dBTDC) 302, which is shown on the horizontal axis.

The MAI routine 100 is part of a multi-after fuel injection strategy wherein multiple fuel injection events are executed to introduce fuel into engine cylinders late in the combustion cycle, e.g., during the power stroke. This strategy tends to increase engine-out hydrocarbons, which preferably oxidize in the exhaust aftertreatment system 50 to facilitate warm-up, light-off and subsequent temperature control of one or more of the elements of the exhaust aftertreatment system 50. Overall, the MAI routine 100 controls duration of one or more of the second set of fuel injection events based upon temperatures of the exhaust aftertreatment system 50 to control the amount of fuel that is injected. Table 1 is provided as a key wherein the numerically labeled blocks and the corresponding functions are set forth as follows, corresponding to the MAI routine.

TABLE 1

| BLOCK | BLOCK CONTENTS |
|---|---|
| 102 | Initiate operation during engine cold start |
| 104 | Monitor first and second temperatures (T1, T2) |
| 106 | Select weighting value based upon T1, T2 |
| 108 | Provide the second fuel injection events to controller, including applying the weighting value for the last of the second fuel injection events and execute injection events |
| 110 | End |

During engine operation, each of the fuel injectors is controlled to execute a first set of fuel injection events during each cylinder event in response to an output torque request, such as may be input by an operator. Example first fuel injection events 312, 314 and 316 are shown graphically with reference to FIG. 3. During engine operation under certain conditions, e.g., an engine cold start, a second set of fuel injection events may be executed during each cylinder event late in the combustion cycle to facilitate warm-up of the exhaust aftertreatment system 50. Example second fuel injection events 322, 324, 326 and 328 are shown graphically with reference to FIG. 3. The MAI routine 100 controls execution of the second set of fuel injection events to introduce fuel into each engine cylinder late in the combustion cycle, e.g., during the power stroke, using multiple fuel injection events. The second set of fuel injection events are selected to keep heat release above zero to avoid misfire during the next cylinder event, which may be caused by a decrease in the in-cylinder temperature to a level that is below an auto-ignition temperature for diesel fuel. The second set of fuel injection events are limited around TDC to minimize torque generation, since the primary purpose of the second set of fuel injection events is to provide hot exhaust gases to effect catalyst warm-up.

The MAI routine 100 preferably executes during the engine cold start event (102), and may execute at other opportune times, depending upon aftertreatment-specific needs and calibrations. An engine cold start event is preferably commanded when the engine temperature is at or near the ambient temperature, with the engine temperature indicated by the ECT sensor 38 in certain embodiments, and the ambient temperature may be indicated by an intake air temperature sensor that may be associated with the mass airflow sensor 25 in certain embodiments.

In operation, exhaust gas temperatures are monitored, including a first temperature (T1) that is measured or otherwise determined in the exhaust gas feedstream upstream of the oxidation catalyst 56 and a second temperature (T2) that is measured or otherwise determined in the exhaust gas feedstream between the oxidation catalyst 56 and the selective catalyst reduction device 58 (104).

The injection events for the second set of fuel injection events are selected, each having a preferred duration. As described herein, the second set of fuel injection events is commanded during each cylinder event after the piston in the respective cylinder has reached a TDC point and has entered into the power stroke. In certain embodiments, there may be a quantity of four second injection events, as shown with reference to elements 322, 324, 326 and 328 in FIG. 3, with the last of the second fuel injection events indicated by element 328.

The duration of the last of the second fuel injection events is determined based upon T1 and T2 (106). In certain embodiments, a predetermined calibration table 105 may be developed that provides weighting values 107 for the last of the second fuel injection events based upon T1 and T2. Overall, the duration of the last of the second fuel injection events may be selected based upon T1 and T2 such that the weighting value for the last of the second fuel injection events is 0% when T1 is less than a minimum temperature, e.g., less than 150 C. Furthermore, the duration of the last of the second fuel injection events may be selected based upon T1 and T2 such that the weighting value for the last of the second fuel injection events is 100% of its original commanded value when T1 is greater than a second temperature, e.g., greater than 180 C. Furthermore, the duration of the last of the second fuel injection events may be selected based upon T1 and T2 such that the weighting value for the last of the second fuel injection events is between 0% and 100% when T2 is greater than a third temperature, e.g., greater than 350 C, or when T1 is greater than a fourth temperature, e.g., greater than 275 C. The numerical values for the thresholds related to the T1 and T2 temperatures and the weighting values are non-limiting examples. Actual numerical values are engine-specific, and may be determined during engine development.

The preferred durations of the injection events for the second set of fuel injection events including the preferred weighting value for the last of the second fuel injection events are provided to the controller 15 for execution (108). The controller 15 applies the preferred weighting value to the last of the second fuel injection events to determine the preferred duration of the last of the second set of fuel injection events, which is a weighted portion of a maximum value for the last of the second fuel injection events. The second set of fuel injection events is provided to the controller 15 for implementation. This iteration then ends (110). Thus, the last injection event of the second set of fuel injection events may be advantageously controlled to effect catalyst warmup after a cold start event. This includes enabling rapid warmup of the second exhaust aftertreatment device 58, while minimizing a likelihood of hydrocarbon breakthrough past the second exhaust aftertreatment device 58 after a cold start event.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An internal combustion engine system, comprising:
   an internal combustion engine including a plurality of fuel injectors disposed to directly inject fuel into cylinders of the internal combustion engine;
   an exhaust aftertreatment system fluidly coupled to an exhaust manifold of the internal combustion engine, the exhaust aftertreatment system including an oxidation catalyst disposed upstream of a second catalytic device,
   a first temperature sensor disposed to monitor a first temperature of an exhaust gas feedstream upstream of the oxidation catalyst;
   a second temperature sensor disposed to monitor a second temperature of the exhaust gas feedstream downstream of the oxidation catalyst;
   a controller operatively connected to the plurality of fuel injectors and disposed to monitor the first and second temperature sensors, the controller including an instruction set executable to:
      detect a cold start engine starting event,
      monitor the first and second temperature sensors,
      control each of the fuel injectors to execute a first set of fuel injection events for each cylinder event in response to an output torque request, and execute a second set of fuel injection events for each cylinder event after cylinder top-dead-center,
      wherein the second set of fuel injection events includes a final injection event, and
      wherein a duration of the final injection event is determined based upon the first and second temperatures of the exhaust gas feedstream.

2. The internal combustion engine system of claim 1, wherein the internal combustion engine is a compression-ignition engine.

3. The internal combustion engine system of claim 1, wherein the second catalytic device is a selective catalytic reduction device.

4. The internal combustion engine system of claim 1, wherein the final injection event of the second set of fuel injection events is omitted when the first temperature of the exhaust gas feedstream is less than a first temperature threshold.

5. The internal combustion engine system of claim 1, wherein the final injection event of the second set of fuel injection events is a maximum duration when the first temperature of the exhaust gas feedstream is greater than a second temperature threshold.

6. The internal combustion engine system of claim 1, wherein the final injection event of the second set of fuel injection events is a weighted portion of a maximum duration when the first temperature of the exhaust gas feedstream is greater than a first temperature threshold and less than a second temperature threshold.

7. The internal combustion engine system of claim 1, wherein the final injection event of the second set of fuel injection events is a weighted portion of a maximum duration when the second temperature of the exhaust gas feedstream is greater than a third temperature threshold.

8. The internal combustion engine system of claim 1, wherein the final injection event of the second set of fuel injection events is a weighted portion of a maximum duration when the first temperature of the exhaust gas feedstream is greater than a fourth temperature threshold.

9. A method for controlling a direct-injection internal combustion engine system fluidly coupled to an exhaust aftertreatment system including an oxidation catalyst disposed upstream of a second catalytic device, the method comprising:
   determining a first temperature of an exhaust gas feedstream upstream of the oxidation catalyst;
   determining a second temperature of the exhaust gas feedstream downstream of the oxidation catalyst;
   detecting a cold start engine starting event;
   controlling each of the fuel injectors to execute a first set of fuel injection events for each cylinder event in response to an output torque request; and
   controlling each of the fuel injectors to execute a second set of fuel injection events for each cylinder event after cylinder top-dead-center;
   wherein the second set of fuel injection events includes a final injection event; and
   wherein a duration of the final injection event is determined based upon the first and second temperatures of the exhaust gas feedstream.

10. The method of claim 9, further comprising omitting the final injection event of the second set of fuel injection events when the first temperature of the exhaust gas feedstream is less than a first temperature threshold.

11. The method of claim 9, comprising maximizing duration of the final injection event of the second set of fuel injection events when the first temperature of the exhaust gas feedstream is greater than a second temperature threshold.

12. The method of claim 9, comprising controlling the final injection event of the second set of fuel injection events as a weighted portion of a maximum duration when the first temperature of the exhaust gas feedstream is greater than a first temperature threshold and less than a second temperature threshold.

13. The method of claim 9, comprising controlling the final injection event of the second set of fuel injection events as a weighted portion of a maximum duration when the second temperature of the exhaust gas feedstream is greater than a third temperature threshold.

14. The method of claim 9, comprising controlling the final injection event of the second set of fuel injection events as a weighted portion of a maximum duration when the first temperature of the exhaust gas feedstream is greater than a fourth temperature threshold.

15. A method for controlling a direct-injection compression-ignition internal combustion engine system fluidly coupled to an exhaust aftertreatment system including an oxidation catalyst disposed upstream of a selective catalytic reduction device, the method comprising:

determining a first temperature of an exhaust gas feedstream upstream of the oxidation catalyst;

determining a second temperature of the exhaust gas feedstream upstream of the selective catalytic reduction device;

detecting occurrence of a cold start engine starting event, controlling each of the fuel injectors to execute a first set of fuel injection events for each cylinder event during a compression stroke in response to an output torque request, and controlling each of the fuel injectors to execute a second set of fuel injection events for each cylinder event during a power stroke, wherein the second set of fuel injection events includes a final injection event, and wherein a duration of the final injection event is determined based upon the first and second temperatures of the exhaust gas feedstream.

16. The method of claim 15, further comprising omitting the final injection event of the second set of fuel injection events when the first temperature of the exhaust gas feedstream is less than a first temperature threshold.

17. The method of claim 15, comprising maximizing duration of the final injection event of the second set of fuel injection events when the first temperature of the exhaust gas feedstream is greater than a second temperature threshold.

18. The method of claim 15, comprising controlling the final injection event of the second set of fuel injection events as a weighted portion of a maximum duration when the first temperature of the exhaust gas feedstream is greater than a first temperature threshold and less than a second temperature threshold.

19. The method of claim 15, comprising controlling the final injection event of the second set of fuel injection events as a weighted portion of a maximum duration when the second temperature of the exhaust gas feedstream is greater than a third temperature threshold.

20. The method of claim 15, comprising controlling the final injection event of the second set of fuel injection events as a weighted portion of a maximum duration when the first temperature of the exhaust gas feedstream is greater than a fourth temperature threshold.

* * * * *